United States Patent
Liebherr

(10) Patent No.: US 9,912,632 B2
(45) Date of Patent: Mar. 6, 2018

(54) HIGH AVAILABILITY INTERNET PROTOCOL ADDRESS SOLUTION FOR DISASTER RECOVERY

(71) Applicant: Wolf Liebherr, Bad-Schonborn (DE)

(72) Inventor: Wolf Liebherr, Bad-Schonborn (DE)

(73) Assignee: SAP SE, Walldorf (DE)

(*) Notice: Subject to any disclaimer, the term of this patent is extended or adjusted under 35 U.S.C. 154(b) by 658 days.

(21) Appl. No.: 14/522,923

(22) Filed: Oct. 24, 2014

(65) Prior Publication Data
US 2016/0119275 A1 Apr. 28, 2016

(51) Int. Cl.
| G06F 15/177 | (2006.01) |
| H04L 29/12 | (2006.01) |
| H04L 29/14 | (2006.01) |
| H04L 12/715 | (2013.01) |
| H04L 12/741 | (2013.01) |

(52) U.S. Cl.
CPC .......... *H04L 61/2007* (2013.01); *H04L 45/04* (2013.01); *H04L 61/1511* (2013.01); *H04L 69/40* (2013.01); *H04L 45/74* (2013.01); *H04L 61/103* (2013.01)

(58) Field of Classification Search
CPC ..... H04L 61/2007; H04L 45/04; H04L 45/74; H04L 61/10; H04L 61/103; H04L 61/1511; H04L 69/40
USPC .......................................................... 709/220
See application file for complete search history.

(56) References Cited

U.S. PATENT DOCUMENTS

| 2001/0056554 A1* | 12/2001 | Chrabaszcz ......... G06F 11/1658 714/13 |
| 2002/0183044 A1* | 12/2002 | Blackwell ............ G06Q 10/107 455/412.1 |
| 2004/0268175 A1* | 12/2004 | Koch .................. H04L 67/1034 714/4.11 |
| 2008/0288937 A1* | 11/2008 | Waterkamp ............. H04L 63/20 717/177 |
| 2009/0254649 A1* | 10/2009 | Coffey .............. H04L 29/12264 709/224 |
| 2014/0136660 A1* | 5/2014 | Ghai .................... H04L 12/2836 709/219 |
| 2015/0113313 A1* | 4/2015 | Chen ................... G06F 11/2007 714/4.11 |

* cited by examiner

*Primary Examiner* — Tauqir Hussain
(74) *Attorney, Agent, or Firm* — Mintz Levin Cohn Ferris Glovsky and Popeo, P.C.

(57) ABSTRACT

A system, a method, and a computer program product for providing a high availability internet protocol address are disclosed. At a first customer routing domain, a high availability internet protocol ("HA IP") address is generated and configured on a first computing device located within the first customer routing domain. The HA IP address is forwarded to a second computing device located within at least one of the first customer routing domain and a second customer routing domain. The forwarded HA IP address is configured on the second computing device. The second customer routing domain is connected to the first customer routing domain using a transport mechanism. The first and second computing devices can be configured as a host for providing a communication capability to the customer routing domains based on the high availability internet protocol address.

20 Claims, 9 Drawing Sheets

HIGH AVAILABILITY INTERNET PROTOCOL ADDRESS SOLUTION FOR DISASTER RECOVERY

TECHNICAL FIELD

This disclosure relates generally to data processing and, in particular, to providing a high availability internet protocol address solution.

BACKGROUND

Today's enterprises rely on a wide variety of computing systems to provide their customers with products and services. These can be programs that an end-user runs to accomplish certain tasks and can work in conjunction with one or more back-end systems, which can store the data to be worked on, such as, for example, business objects and other business data, as well as logic for manipulating the data, such as for example transactions or other business logic. Examples of back-end systems may include database systems, enterprise resource planning ("ERP") systems, and customer relationship management ("CRM") systems.

Users can design and/or create various business process objects, such as sales orders, invoices, etc. A business object can be created using any known computing systems and languages (e.g., one such exemplary language includes advanced business application programming ("ABAP") high level programming language, which is available from SAP SE, Walldorf, Germany). Such created objects can be stored in memory, such as in a database. An example of such database includes a High-Performance Analytic Appliance ("HANA"), which is a column-oriented, in-memory database appliance available from SAP SE, Walldorf, Germany.

Computing systems process and store a significant amount of data. Access to and availability of such data is important to ensure smooth operations the businesses. Many enterprises use various backup services and/or disaster recovery structures and/or systems to substantially guarantee uninterrupted access to data, software applications, and/or other computing hardware and/or software. However, currently available disaster recovery systems are inefficient, costly, and can be unreliable.

SUMMARY

In some implementations, the current subject matter relates to a computer-implemented method for providing a high availability internet protocol address. The method can include generating, at a first customer routing domain, a high availability internet protocol address; configuring, at the first customer routing domain, the generated high availability internet protocol address on at least one first computing device located within the first customer routing domain; and forwarding the configured high availability internet protocol address to at least one second computing device located within at least one of the first customer routing domain and a second customer routing domain and configuring the forwarded high availability internet protocol address on the at least one second computing device located within at least one of the first customer routing domain and the second customer routing domain being connected to the first customer routing domain using a transport mechanism. At least one of the first computing device and the second computing device can be configured as a host for providing a communication capability to at least one of the first customer routing domain and the second routing domain based on the high availability internet protocol address. At least one of the generating, the configuring, and the forwarding can be performed on at least one processor of at least one computing system.

In some implementations, the current subject matter can include one or more of the following optional features. The first customer routing domain can include a first customer gateway server for performing the forwarding. The second customer routing domain can include a second customer gateway server for receiving the configured high availability internet protocol address and forwarding the configured high availability internet protocol address to the at least one second computing device. The transport mechanism can include a generic routing encapsulation protocol. The first customer gateway server can be connected to the second customer gateway server using at least one tunnel implementing the generic routing encapsulation protocol.

In some implementations, the first customer routing domain can include a first router for performing the forwarding. The second customer routing domain can include a second router for receiving the configured high availability internet protocol address and forwarding the configured high availability internet protocol address to the at least one second computing device. The transport mechanism can include a generic routing encapsulation protocol, where the first router can be connected to the second router using at least one tunnel implementing the generic routing encapsulation protocol.

In some implementations, the transport mechanism can connect a first production network of the first customer routing domain and a second production network of the second customer routing domain.

The first customer routing domain and the second customer routing domain can be located in a cloud enterprise system.

In some implementations, the first computing device can include a first primary internet protocol address for communicating with at least another computing device in at least one of the first customer routing domain and the second customer routing domain. The second computing device, after receiving the generated high availability internet protocol address, can provide communication with the at least another computing device using a second primary protocol address of the second computing device when the first computing device is not available.

In some implementations, the forwarding of information containing the configured high availability internet protocol addresses can be performed using a domain name system text record.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address these and potentially other deficiencies of currently available solutions, one or more implementations of the current subject matter provide methods, systems, articles or manufacture, and the like that can, among other possible advantages, provide for a high availability internet protocol address solution.

In some implementations, the current subject matter relates to providing a high availability internet protocol address solution in various enterprise cloud networks. These can be useful in the event that one or more components in a network become unavailable (e.g., hardware and/or software failure, natural disaster, etc.). The current subject matter can provide network-level connectivity of the enterprise cloud network datacenter sites and to extend functionalities of datacenter's customer gateway server ("CGS") to allow setup of cost-efficient disaster recovery environments that can support high availability scenarios.

Figure 1:
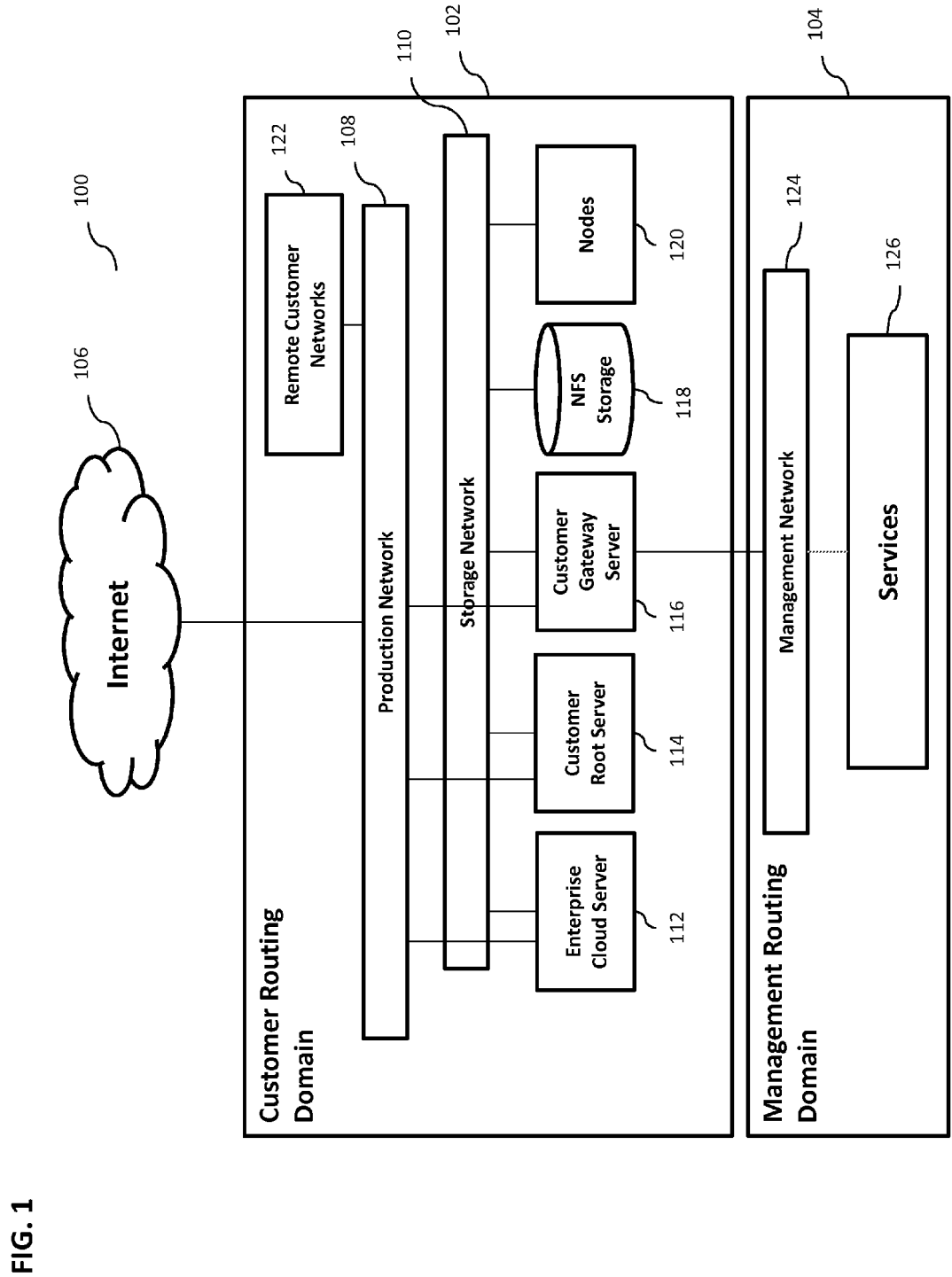
FIG. 1 illustrates an exemplary enterprise cloud system, according to some implementations of the current subject matter.

FIG. 1 illustrates an exemplary enterprise cloud system 100, according to some implementations of the current subject matter. In some implementations, the enterprise cloud system 100 can be implemented in a High-Performance Analytic Appliance ("HANA") Enterprise Cloud ("HEC"), developed by SAP SE, Walldorf, Germany.

The system 100 can include a customer routing domain 102 and a management routing domain 104. The customer routing domain 102 can be communicatively coupled to the management routing domain 104 and the internet 106. The customer routing domain 102 can include an enterprise cloud server 112, a customer root server 114, a customer gateway server 116, a network file system ("NFS") storage 118 (other storage technologies can also be used.), customer nodes 120, and remote customer networks 122. The enterprise cloud server 112 can be a machine/system component that can be owned and/or maintained/managed by a cloud provider (e.g., SAP HEC, as available from SAP SE, Walldorf, Germany). The customer root server 114 can be maintained/managed by the customer but owned by the cloud provider. NFS can provide central storage capacity to customer systems. Other storage environments can be used, which can include various de-centralized storage technologies. Customer nodes 120 can be servers that can be connected to the storage network and can be used if, for example, the customer has very specific storage/backup requirements to fulfill. The remote customer networks 122 can be a complete network environment of the customer. These components can be communicatively coupled using a storage network 110 and/or a production network 108. In order to isolate certain applications/system components within a customer routing domain, it may also be possible to deploy several "production" networks, e.g., for separating development, quality assurance and production systems from each other and/or for placing human resources management and customer relationship management servers in distinct network areas.

The production network 108 (for example, in HANA, it can be identified by the following address: 10.6.0.[1-N]) can provide connection from various server nodes to a corporate local area network and/or a server local area network of a customer. The production network 108 can include various entries that can refer to public hostnames, which can be known to customer's corporate domain name system ("DNS") service and can be resolved by the DNS service.

The storage network 110 (for example, in HANA, it can be identified by the following address: 192.168.111.[1-N]) can be used for data traffic to and from one or more storage units where data persistency can be located. Depending on a vendor of the hardware supporting the customer routing domain 102, the storage units can share the same or separate storage systems. The configuration of the storage network 110 can ensure that only storage/backup data traffic goes through dedicated network interfaces and related infrastructure.

The networks 108, 110 can be local area networks. In particular, the enterprise cloud server 112 can be communicatively coupled to the production network 108 and the storage network 110. The customer root server 114 can also be communicatively coupled to both networks 108, 110. The NFS storage 118 and the nodes 120 can be communicatively coupled to the storage network 118. The remote customer networks 122 can be communicatively coupled to the production network 108

The management routing domain 104 can include a plurality of services 126 and a management network 124. The management network 124 can be a local area network as well. The plurality of services 126 can include a various infrastructure services, central services, terminal server networks, shared customer services, as well as any other services. The management routing domain 104 can be used to logically group networks that are hosting central services, such as DNS and/or NTP servers that can be used by all customers within the HEC. The management routing domain 104 can be completely under the control by cloud provider. As shown in FIG. 1, the managed network 124 can also be part of the management routing domain 104.

The customer gateway server 116 can provide communication between the customer routing domain 102 and the management routing domain 104. The customer gateway server 116 can also be considered as a bastion host that can decouple the customer routing domain from any other network environment (e.g., management routing domain 104 or other customer routing domains) at the cloud provider. In particular, the customer gateway server can provide communication between the management network 124 of the management routing domain 104 and the storage network 110 and production network 108 of the customer routing domain 102.

In some implementations, in order to isolate various customer servers and/or systems from each other and from various central infrastructure components, all shared (management and storage) networks for customer devices can be removed, and instead, the customer gateway server 116 can be configured to play an intermediary role. The customer gateway server 116 can perform hosting of application-level proxies. The customer gateway server 116 can also act as a central firewall and a network address translation ("NAT") gateway for each customer landscape. In some implementations, the customer gateway server 116 can be the only server having a direct network connection to the management network 124. All other applications and/or servers in the customer routing domain 102 can be connected to private, customer-specific networks only located within the customer routing domain 102. The customer gateway server 116 serves to provide such connection to the management network 124 to such applications and/or servers.

Figure 2:
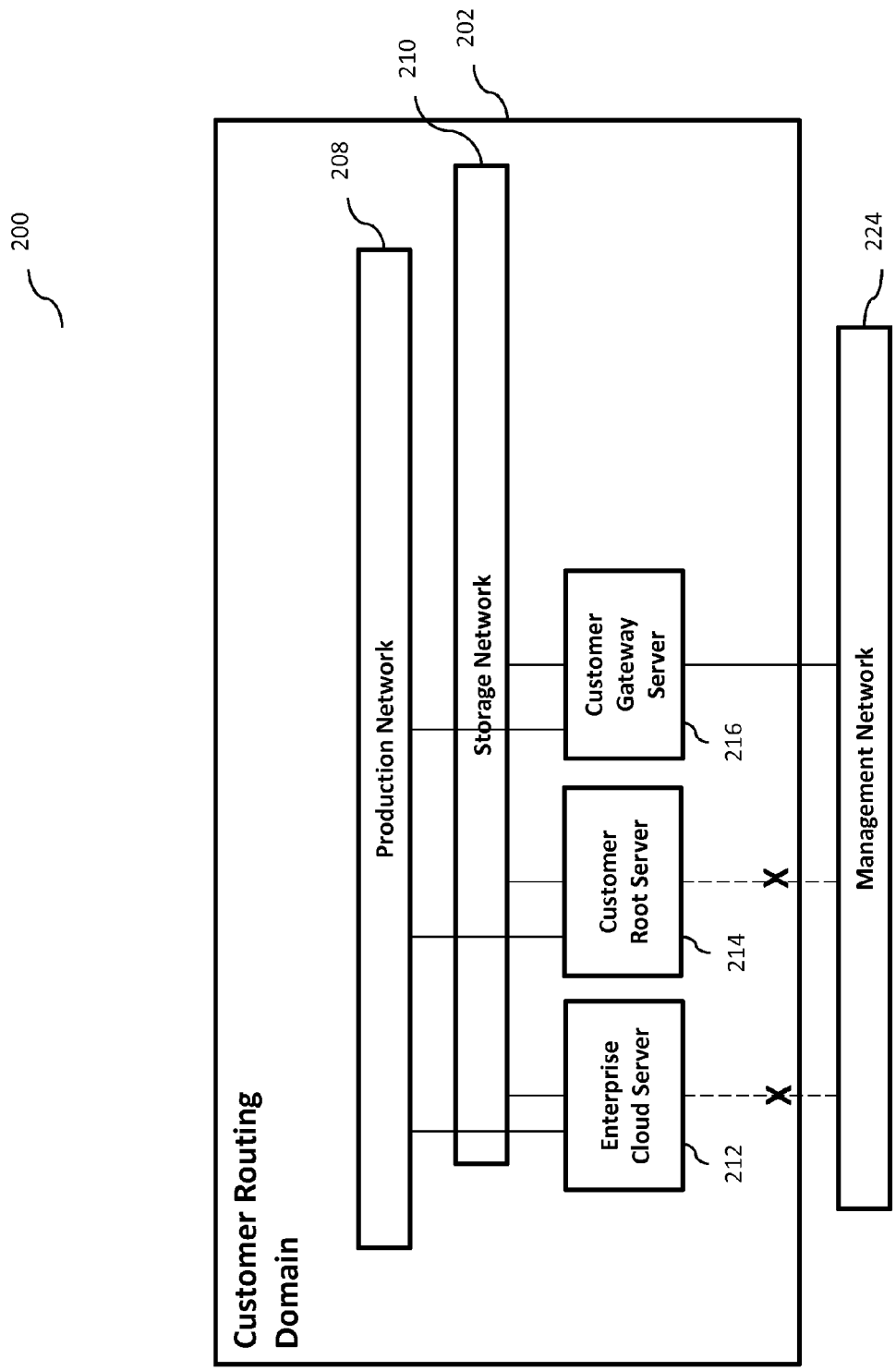
FIG. 2 illustrates an exemplary system containing a customer routing domain, according to some implementations of the current subject matter.

FIG. 2 illustrates an exemplary system 200 containing a customer routing domain 202, according to some implementations of the current subject matter. The customer routing domain 202 can include a production network 208, a storage network 210, an enterprise cloud server 212, a customer root server 214, and a customer gateway server 216. These components are similar to the like components shown in FIG. 1. The customer routing domain 202 can be communicatively coupled to the management network 224. Similar to FIG. 1, the customer gateway server 216 can provide communications capabilities between the management network 224 and the production network 208 and/or the storage network 210. The enterprise cloud server 212 and the customer root server 214 can use various private networks that can be specific to the customer routing domain 202 for connection to the production network 208 and/or the storage network 210 and eventual connection to the management network 224 via the customer gateway server 216. The customer gateway server 216 can provide appropriate connectivity, including network address translation services.

Thus, without the network address translation capability at the customer gateway server 216, the servers (e.g., the enterprise cloud server 212, the customer root server 214) located within customer routing domain 202 may need to setup a direct connection to the management network 224, which may be problematic for various reasons (e.g., security, setup, maintenance, etc.) By implementing one-to-one network address translation at the customer gateway server 216, as shown in FIG. 2, servers within the customer routing domain 202 can be addressed individually from administrator networks located within the customer routing domain 202.

Figure 3:
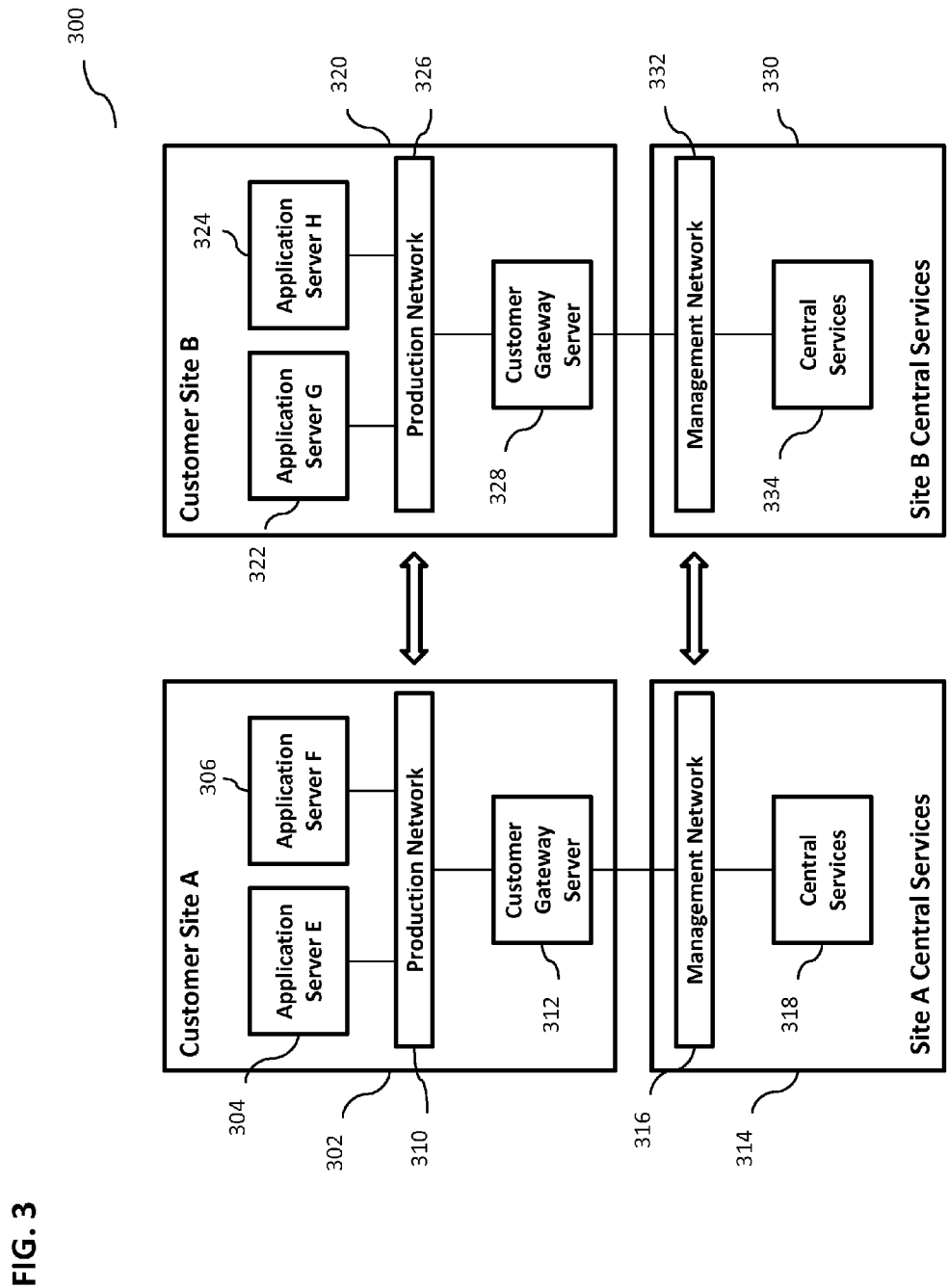
FIG. 3 illustrates an exemplary disaster recovery and/or backup operation system, according to some implementations of the current subject matter.

In some implementations, the current subject matter can also provide disaster recovery (e.g., failure or inoperability of a customer routing domain) and/or backup operation services. FIG. 3 illustrates an exemplary disaster recovery and/or backup operation system 300, according to some implementations of the current subject matter. The system 300 can include a customer routing domain site A 302 and a customer routing domain site B 320. There can be more than one site that can serve as a backup and/or disaster recovery in the event that one of the sites becomes inoperable (e.g., hardware failure, software failure, malicious attack, natural disaster, etc.). The site B 320 can be a mirror of site A 302.

The site A 302 can include components that are similar to the components shown in FIG. 1. For discussion purposes only some of the components are shown in FIG. 3. The site A 302 can include an application server E 304, an application server F 306, both of which can be communicatively coupled to a production network 310. A customer gateway server 312 can also be coupled to the production network 310. The production network 310 can be a local area network that is specific to the customer routing domain. Alternatively, the production network 310 can be any other type of network.

The customer gateway server 312 can also provide communication capabilities between the customer routing domain 302 and site A's central services 314. The customer gateway server 312 can communicatively couple a management network 316 of site A's central services 314. Central services 318 (e.g., DNS, lightweight directory access protocol ("LDAP"), etc.) can be communicatively coupled to the management network 316. The management network 316 can be a local area network and/or any other type of network. The communicative coupling can be via any type of connection (e.g., a wired connection, a wireless connection, and/or any other type of connection).

As stated above, site B 320, which can be a secondary site (and/or disaster recovery and/or backup site, etc.) to the primary site A 302, can include a mirror image of the site A 302. The site B 320 can include an application server G 322, an application server H 324, both of which can be coupled to a production network 326. A customer gateway server 328 of the customer routing domain site B 320 can be coupled to the production network 326 and can communicatively couple site B's central services 330 to the customer routing domain site B 320. The customer gateway server 328 can provide connection between the production network 326 and the management network 332.

To ensure that customer routing domain 320 and central services 330 of site B contain up-to-date information at customer routing domain 302 and central services 314 of site A, respectively, the production networks 310 and 326 as well as the management networks 316 and 332 can exchange information. In some case, this information can be a backup information that can be provided from one network to the other to ensure that both sites contain an up to date content. By exchanging appropriate information, the information can be synchronized between the two sites.

In some exemplary implementations, site B can use a distinct open systems interconnection ("OSI") Layer-3 internet protocol ("IP") network. This can simplify execution of disaster recovery procedures and/or tests that may be necessary to ensure proper operation of the site B as well as storage of correct information. Use of this protocol can further ease deployment of various management tools. Access to site B can be controlled using various domain name system ("DNS") resource records that can be shared with the customer. In some cases, OSI Layer-2 networks can be used either by implementing a virtual local area network ("VLAN") based coupling of datacenters and/or by implementing vendor-specific L2-tunneling solutions.

In some implementations, in order to be independent from availability of L2 connections (which may be leased from various telecommunication providers) and/or to be independent from network vendors, the datacenter sites (e.g., site A and site B shown in FIG. 3) can be coupled using a tunneling protocol, such as a generic routing encapsulation ("GRE") protocol. Any other transport mechanisms can be used, such as multiprotocol label switching ("MPLS"), virtual extensible local area network ("VXLAN'"), etc. When GRE is used, it can encapsulate a variety of network layer protocols inside virtual point-to-point links over an internet protocol inter-network. The GRE can be used to transport data packets over a network, where information can be sent from one network to the other through a GRE tunnel.

Using GRE tunneling protocol, packets can be encapsulated into IP packets and redirected to an intermediate host, where they can be de-encapsulated and routed to their final destination. GRE tunnels can allow routing protocols, such as routing information protocol ("RIP), open shortest path first ("OSPF"), etc., to forward data packets from one location (e.g., a switch) to another location (e.g., another switch) across a network (e.g., the internet). Further, the using the GRE tunneling protocol, multicast data streams can be encapsulated for transmission over a network (e.g., an internet). The GRE has been described in the in various requests for comment ("RFC") of Internet Engineering Task Force, including RFC 2784. Using the GRE tunneling protocol, a router can encapsulate a payload packet for transport through the tunnel to a destination network. The payload packet can be first encapsulated in a GRE packet, which can be encapsulated using a delivery protocol. The router can extract the tunneled packet and forward it to the destination network.

Figure 4:
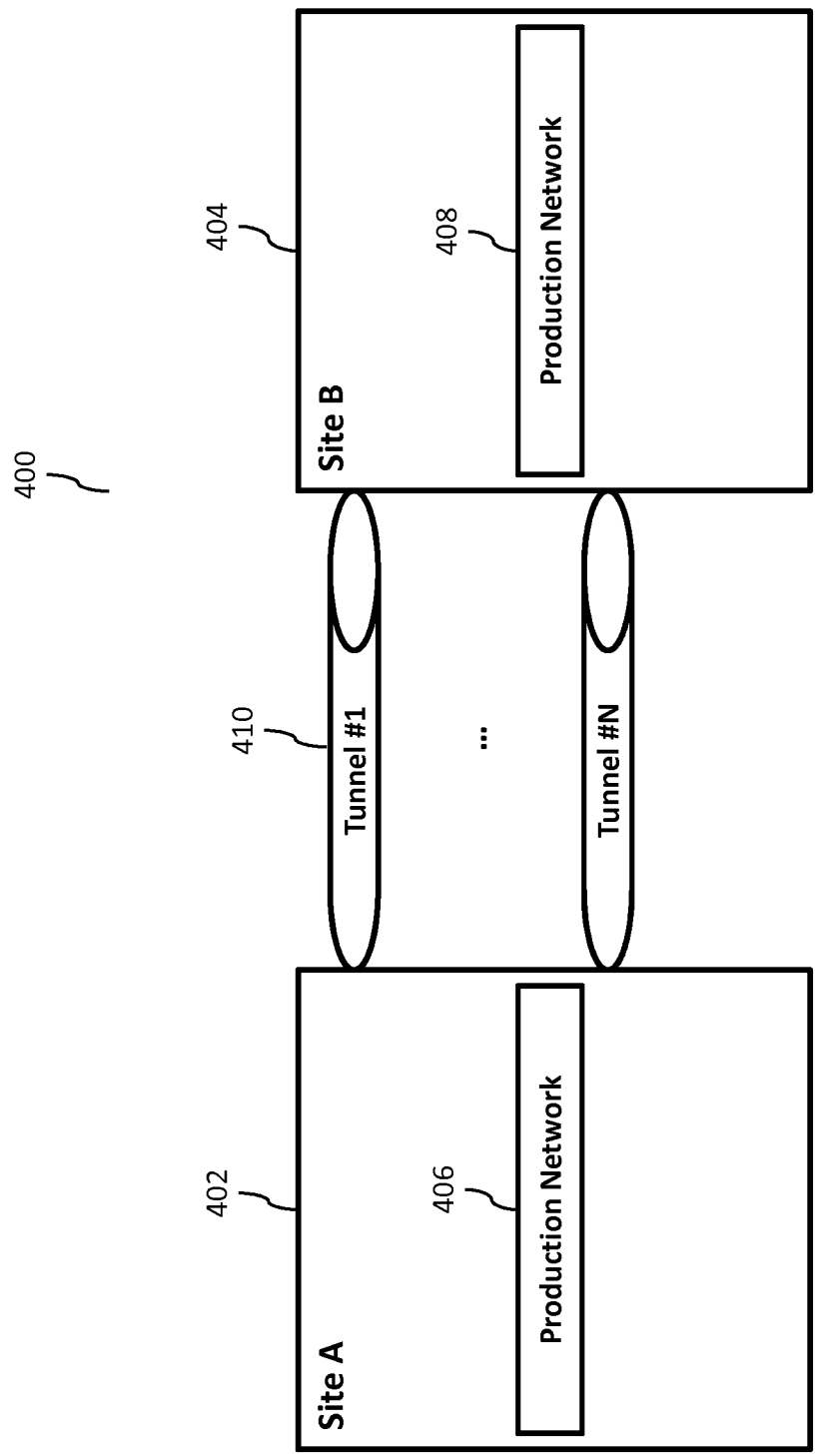
FIG. 4 illustrates an exemplary system that uses generic routing encapsulation protocol for connection between two datacenter sites, according to some implementations of the current subject matter.

FIG. 4 illustrates an exemplary system 400 that uses generic routing encapsulation protocol for connection between two datacenter sites, according to some implementations of the current subject matter. The system 400 can include a datacenter site A 402 that can include a production network 406 and a datacenter site B 404 that can include a production network 408. The datacenter sites 402, 404 can include other components shown in FIG. 1. The datacenter sites 402, 404 can be connected using distinct tunnels (tunnel 1, 2, . . . N, where N is an integer) 410 employing tunneling protocols (e.g., GRE). The tunneling connection can be implemented using various tunneling routers (e.g., L3 Core Routers). The tunneling routers can provide a direct connection between respective production networks 406, 408. Further, use of the distinct tunnels 410 can provide easy coupling of the datacenter sites 402, 404 and can avoid use of expensive OSI Layer-2 connections. In some implementations, the datacenter sites 402, 404 can also implement a dynamic interior gateway protocol ("IGP"). IGP can be used to exchange routing information between gateways (e.g., routers) within a system of corporate local area networks (e.g., production networks 406, 408). Some examples of IGP can include open shortest path first ("OSPF"), routing information protocol ("RIP") and intermediate system to intermediate system ("IS-IS"). In some implementations, use of dynamic IGP-based routing can allow an easier implementation of customer specific quality of service ("QoS") parameters based on the IP addresses of the tunnel endpoints. It should be noted that some routers can allow definition of QoS rules directly within the logical tunnel interface. The IGP deployment within a particular customer routing domain can also assist in development of high availability solutions for disaster recovery-enabled customer networks.

In some implementations, a customer gateway server located in a customer routing domain (such as shown in FIG. 1) can include the interior gateway protocol routing functionalities. This can allow the customer gateway server can directly influence a routing table, provided using the IGP, of the affected network devices.

Figure 5:
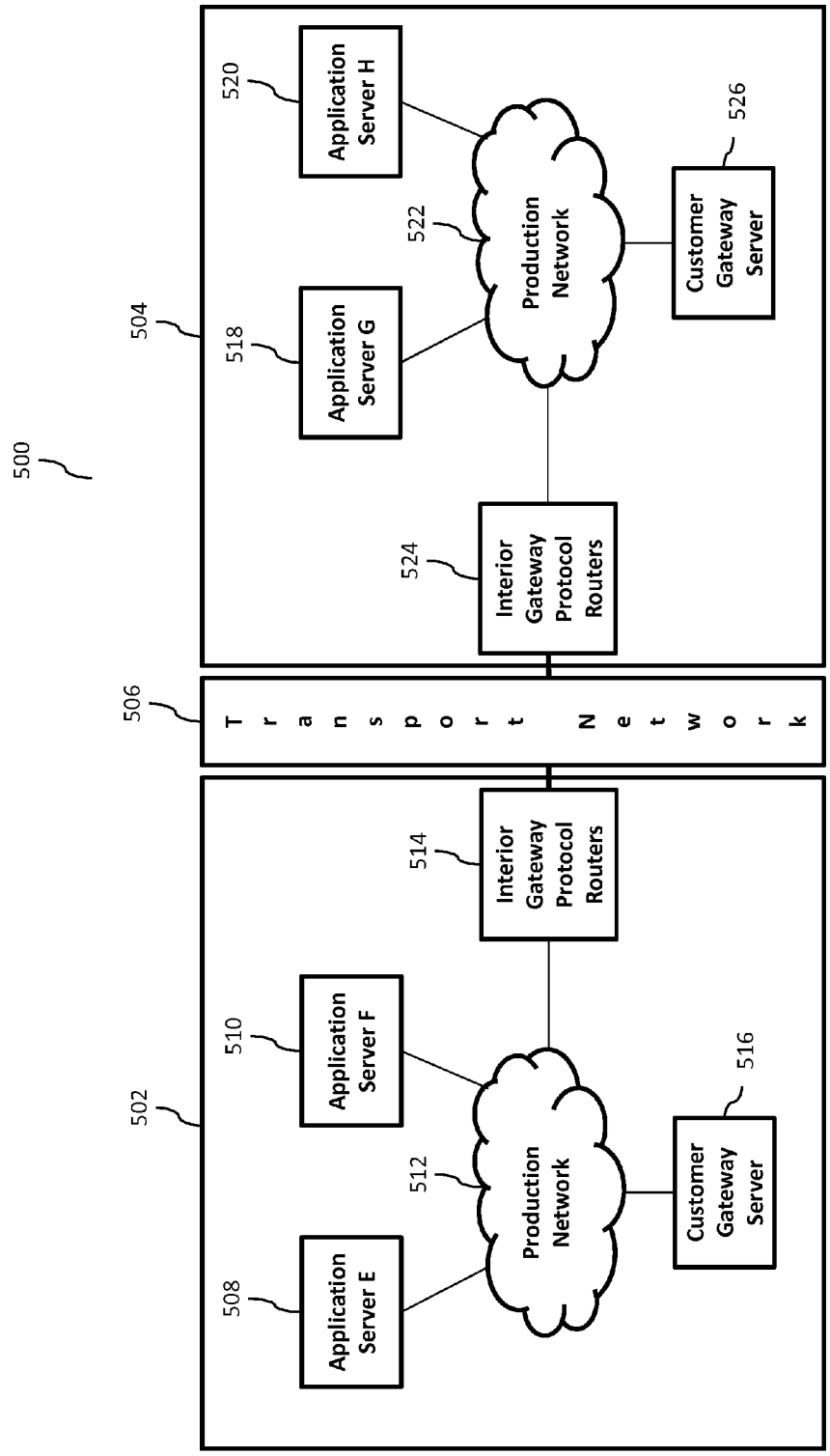
FIG. 5 illustrates an exemplary system having an interior gateway protocol routing functionality, according to some implementations of the current subject matter.

FIG. 5 illustrates an exemplary system 500 having an interior gateway protocol routing functionality, according to some implementations of the current subject matter. The system 500 can include a customer routing domain located at site A 502 that can be communicatively coupled using a transport network 506 to a customer routing domain located at site B 504. The site A 502 can include a production network 512. Application server E 508 and application server F 510 can be coupled to the production network 512. A customer gateway server 516 (similar to customer gateway servers shown in FIG. 1) can be also coupled to the production network 512. The site A 502 can also include one or more interior gateway protocol routers 514.

The site B 504 can include a production network 522. Application server G 518 and application server H 520 can be coupled to the production network 522. A customer gateway server 526 (similar to customer gateway servers shown in FIG. 1) can be also coupled to the production network 522. The site B 504 can also include one or more interior gateway protocol routers 524.

Each component in the customer routing domains 502, 504 can be assigned a unique IP address for identification. For example, at the customer routing domain 502, the application server E 508 can be assigned an IP address of 10.0.0.10; the application server F 510 can be assigned IP address of 10.0.0.11; the production network 512 can be assigned IP address of 10.0.0.0/24; and the customer gateway server 516 can be assigned an IP address 10.0.0.254. Similarly, the components at the customer routing domain 504, the application server G 518 can be assigned an IP address of 20.0.0.20; the application server H 520 can be assigned IP address of 20.0.0.21; the production network 522 can be assigned IP address of 20.0.0.0/24; and the customer gateway server 526 can be assigned an IP address 20.0.0.254. These IP addresses can be referred to as productive IP addresses and can be used for communications between devices in the system 500.

In some implementations, the routers 514 and 524 (e.g., L3 Core Routers) can provide a tunneling connectivity between sites A and B. Further, the sites A and B can implement use of a high availability IP address that can be used to route data packets in the event an IP address of a particular component in the system 500 becomes unavailable (e.g., hardware/software failure, natural disaster, etc.). To implement use of a highly availability IP address, the IP address can be setup and/or configured on a server in the customer routing domain. For example, the high availability IP address can be configured on application server E 508, as IP address 30.0.0.100. The setup can be accomplished by adding the high availability IP address as a secondary IP address of an interface of the production network 512 to identify application server E 508. Alternatively, the high availability IP address can be setup and/or configured as a primary address for one of the loopback devices. In some implementations, the internet protocol suite can include a virtual network interface through which applications can communicate when executing on the same machine. If the high availability internet protocol address is configured onto such a virtual interface and if the application is configured to use that virtual network adapter, all outgoing packets from that application can be automatically routed using the high availability internet protocol address as their source IP address. Another advantage of this loopback adapter is the fact that it can be always available. An application may not notice if the physical network goes up or down. If a high availability internet protocol addresses is configured as a secondary IP address, all outgoing packets from that application can be sent using the primary interface internet protocol address instead of the high availability internet protocol address. In some implementations, internet protocol forwarding and security (e.g., a firewall) features can be also configured.

Once the high availability IP address is assigned to a particular component in the customer routing domain at site A 502, the customer gateway server 516 (and/or any other network device within the customer routing domain site A 502) can inject and propagate a host route into the respective interior gateway protocol, where the route can point to the productive IP address of the application server E 502, i.e., IP address of 10.0.0.10. The host route can also alert other components in the system 500, which can include IGP-enabled network devices, such as customer gateway servers 516, 526 and IGP routers 514, 524, that the IP address of 30.0.0.100 (assigned to the application server E 508) can be reached by forwarding all packets to the application server E 508.

To ensure that availability of components to the customer, application server H 520, which can be a mirror of the application server E 508 can be assigned a respective high availability IP address. For example, this IP address can be 30.0.0.100. Thus, in the event that site A 502 becomes unavailable, the customer gateway server 526 at site B 504 can inject and propagate a new host route that can point to a new destination for the high availability IP address, i.e., application server H 520, having productive IP address of 20.0.0.21, thereby ensuring continuous operations. In some implementations, two or more host routes can be implemented at the same time, so that the respective high availability IP addresses can be active within each datacenter site. This mechanism can be used to facilitate disaster recovery failover tests and/or to implement any-cast-like deployments of certain services (e.g. DNS, network time protocol ("NTP"), etc.).

Most multi-tenant and/or cloud provider environments can allow customers to freely define the IP address ranges for their hosted machines. This can lead to ambiguous DNS query results, which often causes problems in central software components that are not aware or not able to handle such situations. Further, high availability IP addresses and/or disaster recovery capable solutions that do require deployment of static domain name system entries and/or IP addresses that do not change in case of failure events can be typically requested by customers. This can lead to a situation, in which it may no longer be possible to easily determine in which environment and/or on which server certain application components are being executed.

In today's world, many companies are using private IP addresses from various network ranges (as for example, defined in RFC 1918). That can leads to the situation, where certain networks are used several times within the premises of a cloud provider network environment. From the network perspective, various techniques exist to handle these overlapping IP addresses. These, for example, include virtual routing and forwarding ("VRF"), where every tenant receives distinct and/or virtual routing table within every shared network component. Cloud providers often use central tools for managing various tenant environments. However, in many cases, various company software that is used might not be developed for multi-tenant environments and does not support use of proxy components located within the respective tenant environments. Many times, these tools rely on DNS forward or reverse lookups for internal purposes. However, in this case, DNS lookups on central systems may no longer guarantee delivery of non-ambiguous results due to duplicate hostnames and/or duplicate IP addresses.

In some cases, it may be possible to create unique hostnames by using an explicit naming convention; however, reverse lookups on central DNS servers can never be unique. Whenever duplicate IP addresses and multiple PTR records are used, a single reverse lookup can return several entries, which can lead to problems if the software used is not aware of these issues. The same issues are relevant to existing high availability and/or disaster recovery solutions that utilize static IP addresses and/or DNS entries. As such, it may no longer be possible to determine an environment in which and/or the application server on which certain component may be running. For example, the following DNS entry can represent a highly available service in a tenant environment (e.g., "abc.corp") of an enterprise cloud system that can be bound to the IP address 10.10.10.10:

ha-service.hec.abc.corp IN A 10.10.10.10

Depending on the actual use case, it may be possible to relocate the service to another IP address (e.g. "20.0.0.20"). Thus, it would be possible to use the IP address to correctly determine the environment ("Site B") in which the service is running. However, if the IP address needs to remain static in order to prevent DNS caching problems, the IP address has to be "relocated" to another host and/or environment in case of a failure. This can lead to the situation that it is no longer possible to determine the actual location of the service.

Thus, to resolve this issue, in some implementations, domain name system text ("DNS TXT") records can be used to provide information containing the high availability IP address to components within the system 500. A TXT record is a type of DNS record that can provide text information to components, where the text can be either human and/or machine-readable and can be used for a variety of purposes. The DNS TXT records can also be used to distribute various information in multi-tenant and/or cloud provider environments.

Using the above example, the following exemplary DNS TXT record can be used to describe an actual target environment:

| ha-service.hec.abc.corp | IN | A | 10.10.10.10 |
| ha-service.hec.abc.corp | IN | TXT | customer=abc,host=xyz,site=A |

This can enable all users (e.g., administrators, applications, software, etc.) to easily retrieve additional information about certain services with a simple DNS query. The TXT record approach can for example also be used to easily retrieve the names of all customers that are using a certain IP within their environment, as indicated by the following code below:

```
10.10.10.10    IN    PTR    ha-service.hec.abc.corp
10.10.10.10    IN    PTR    ha-service.hec.def.corp
10.10.10.10    IN    TXT    customer=abc,def
```

To retrieve the above information, the following DNS lookup can be used:

```
Server:~ # dig +short @dns TXT -x 10.10.10.10
"customer=abc,def"
Server:~ #
```

In some implementations, the current subject matter can be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 6:
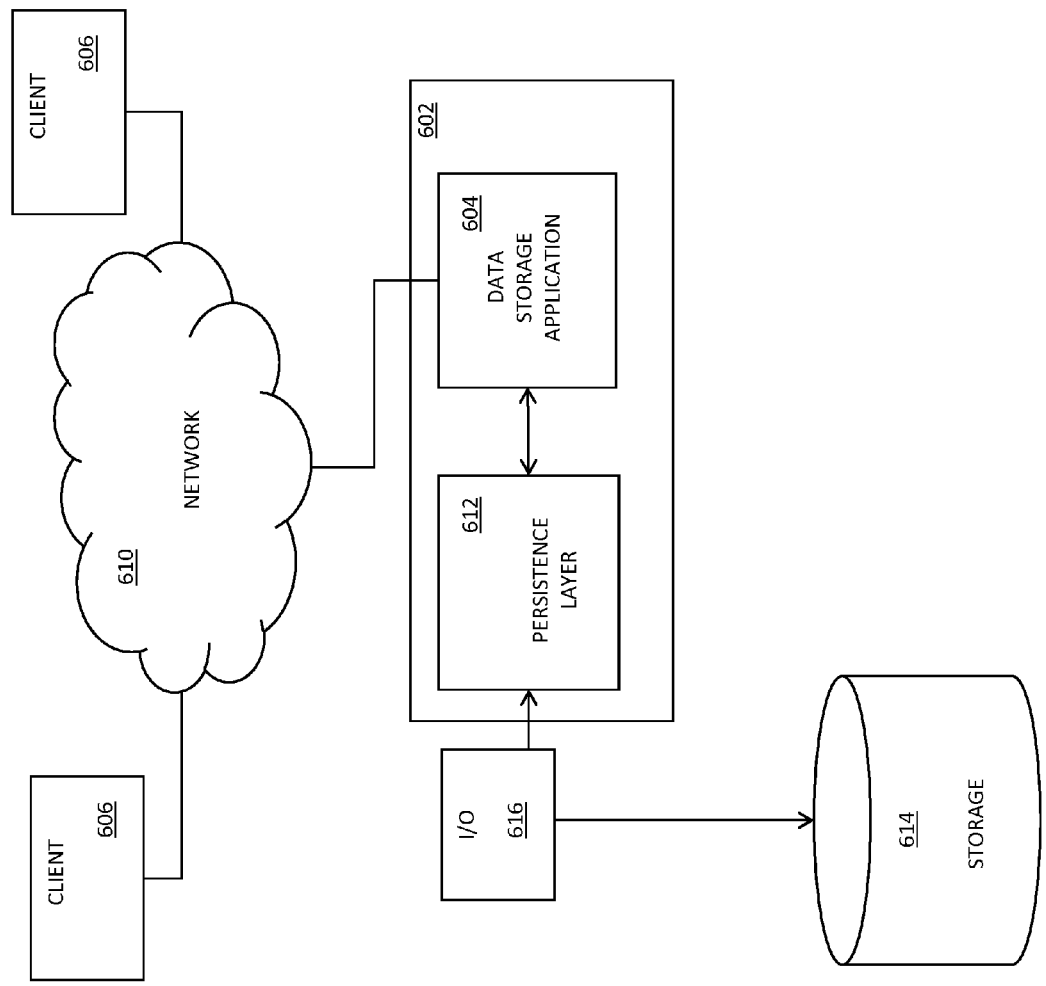
FIG. 6 is a diagram illustrating an exemplary system including a data storage application, according to some implementations of the current subject matter.

FIG. 6 illustrates an exemplary system 600 in which a computing system 602, which can include one or more programmable processors that can be collocated, linked over one or more networks, etc., executes one or more modules, software components, or the like of a data storage application 604, according to some implementations of the current subject matter. The data storage application 604 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 602 as well as to remote users accessing the computing system 602 from one or more client machines 606 over a network connection 610. One or more user interface screens produced by the one or more first modules can be displayed to a user, either via a local display or via a display associated with one of the client machines 606. Data units of the data storage application 604 can be transiently stored in a persistence layer 612 (e.g., a page buffer or other type of temporary persistency layer), which can write the data, in the form of storage pages, to one or more storages 614, for example via an input/output component 616. The one or more storages 614 can include one or more physical storage media or devices (e.g. hard disk drives, persistent flash memory, random access memory, optical media, magnetic media, and the like) configured for writing data for longer term storage. It should be noted that the storage 614 and the input/output component 616 can be included in the computing system 602 despite their being shown as external to the computing system 602 in FIG. 6.

Data retained at the longer term storage 614 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 7:
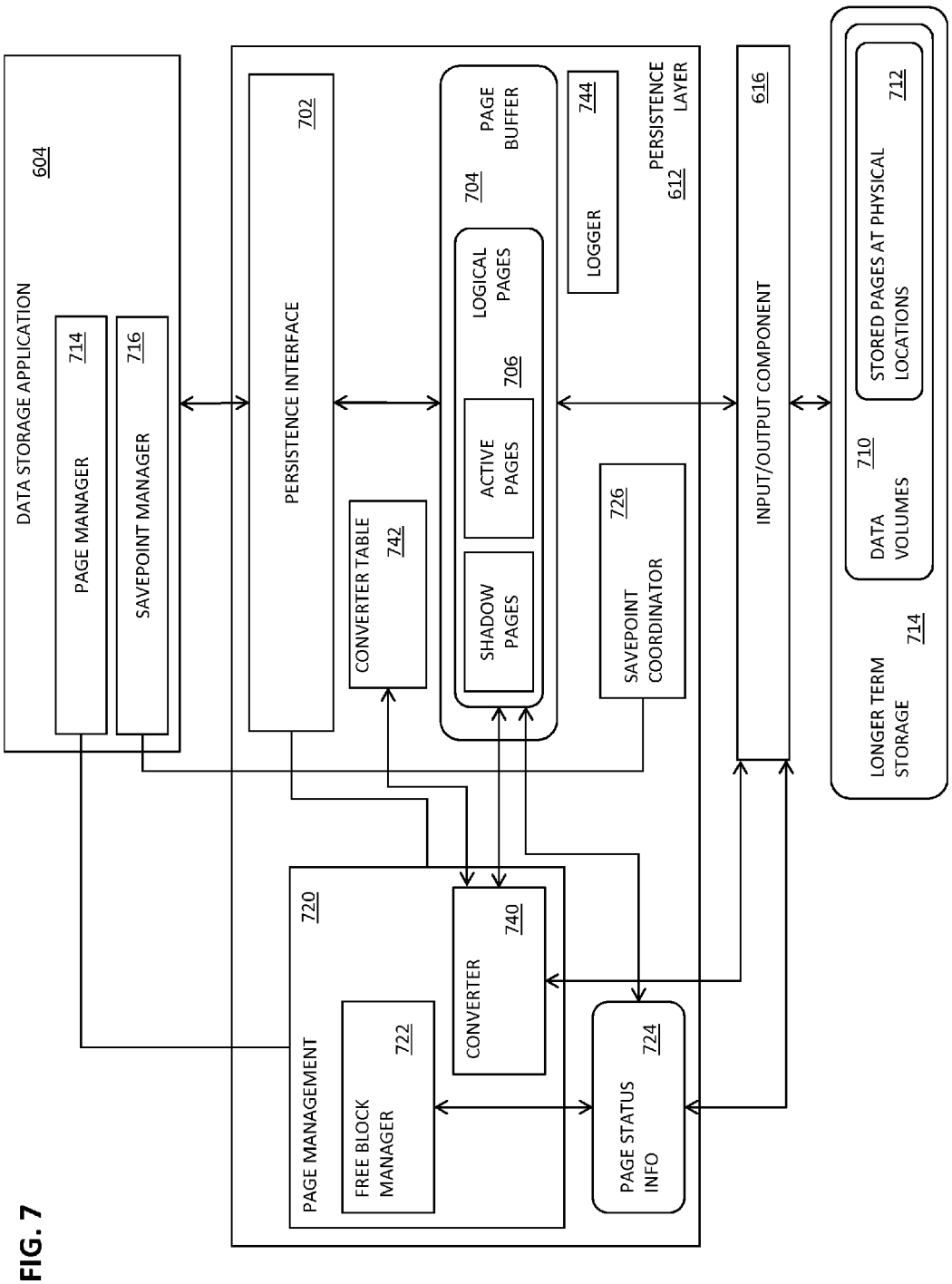
FIG. 7 is a diagram illustrating details of the system of FIG. 6.

FIG. 7 illustrates exemplary software architecture 700, according to some implementations of the current subject matter. A data storage application 604, which can be implemented in one or more of hardware and software, can include one or more of a database application, a network-attached storage system, or the like. According to at least some implementations of the current subject matter, such a data storage application 604 can include or otherwise interface with a persistence layer 612 or other type of memory buffer, for example via a persistence interface 702. A page buffer 704 within the persistence layer 612 can store one or more logical pages 706, and optionally can include shadow pages, active pages, and the like. The logical pages 706 retained in the persistence layer 612 can be written to a storage (e.g. a longer term storage, etc.) 614 via an input/output component 616, which can be a software module, a sub-system implemented in one or more of software and hardware, or the like. The storage 614 can include one or more data volumes 710 where stored pages 712 are allocated at physical memory blocks.

In some implementations, the data storage application 604 can include or be otherwise in communication with a page manager 714 and/or a savepoint manager 716. The page manager 714 can communicate with a page management module 720 at the persistence layer 612 that can include a free block manager 722 that monitors page status information 724, for example the status of physical pages within the storage 614 and logical pages in the persistence layer 612 (and optionally in the page buffer 704). The savepoint manager 716 can communicate with a savepoint coordinator 726 at the persistence layer 612 to handle savepoints, which are used to create a consistent persistent state of the database for restart after a possible crash.

In some implementations of a data storage application 604, the page management module of the persistence layer 612 can implement a shadow paging. The free block manager 722 within the page management module 720 can maintain the status of physical pages. The page buffer 704 can include a fixed page status buffer that operates as discussed herein. A converter component 740, which can be part of or in communication with the page management module 720, can be responsible for mapping between logical and physical pages written to the storage 614. The converter 740 can maintain the current mapping of logical pages to the corresponding physical pages in a converter table 742. The converter 740 can maintain a current mapping of logical pages 706 to the corresponding physical pages in one or more converter tables 742. When a logical page 706 is read from storage 614, the storage page to be loaded can be looked up from the one or more converter tables 742 using the converter 740. When a logical page is written to storage 614 the first time after a savepoint, a new free physical page is assigned to the logical page. The free block manager 722 marks the new physical page as "used" and the new mapping is stored in the one or more converter tables 742.

The persistence layer 612 can ensure that changes made in the data storage application 604 are durable and that the data storage application 604 can be restored to a most recent committed state after a restart. Writing data to the storage 614 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 744 can also be included to store the changes made to the data of the data storage application in a linear log. The logger component 744 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 744 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 612 can use a combination of undo log entries (from one or more logs) and shadow paging.

The persistence interface 702 can handle read and write requests of stores (e.g., in-memory stores, etc.). The persistence interface 702 can also provide write methods for writing data both with logging and without logging. If the logged write operations are used, the persistence interface 702 invokes the logger 744. In addition, the logger 744 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 744. For an entry of type "update", for example, this would be the identification of the affected record and the after image of the modified data.

When the data application 604 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 744 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 744 can write a database log (or simply referred to herein as a "log") sequentially into a memory buffer in natural order (e.g., sequential order, etc.). If several physical hard disks/storage devices are used to store log data, several log partitions can be defined. Thereafter, the logger 744 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 604 can use shadow paging so that the savepoint manager 716 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 8:
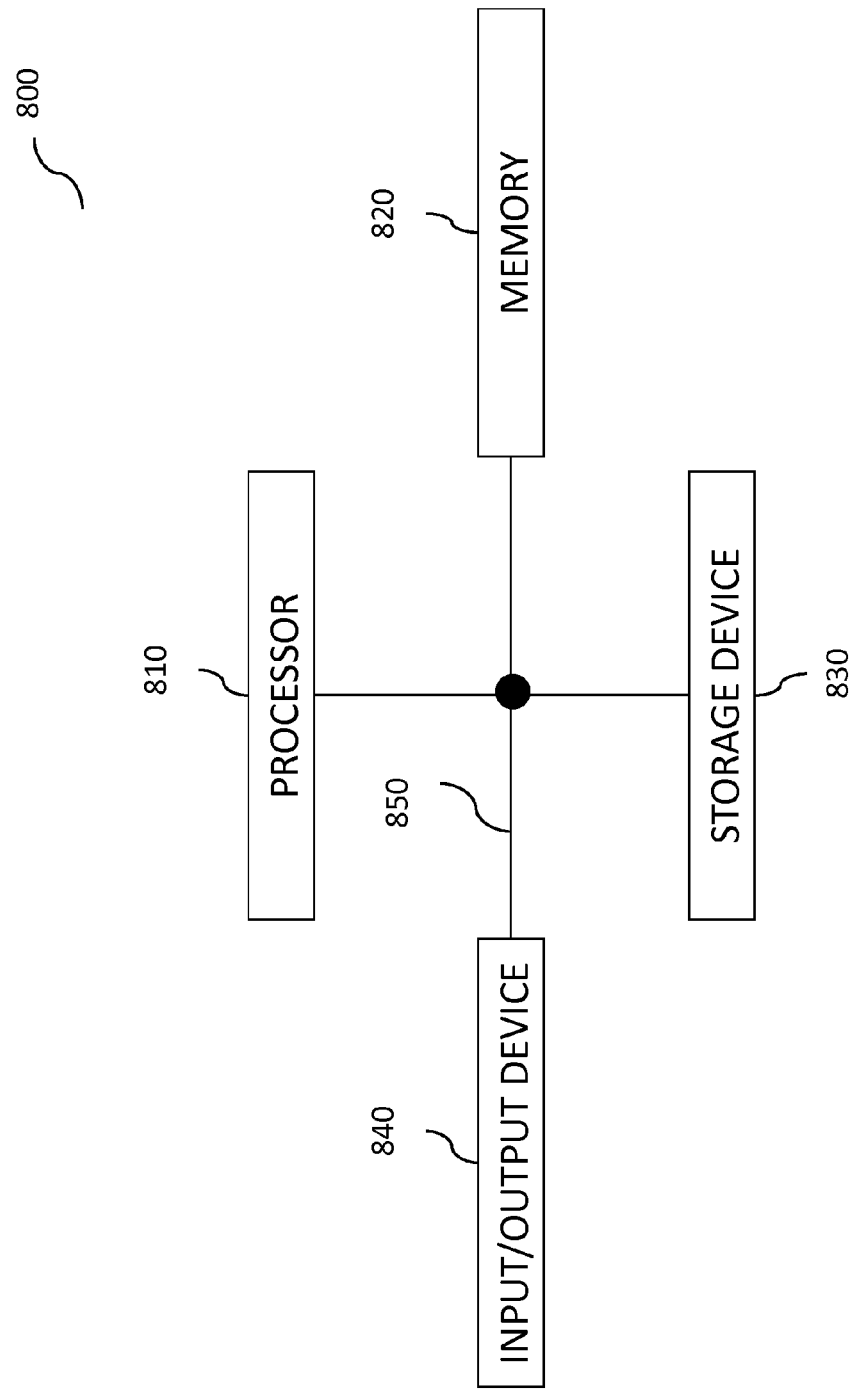
FIG. 8 is an exemplary system, according to some implementations of the current subject matter.

In some implementations, the current subject matter can be configured to be implemented in a system 800, as shown in FIG. 8. The system 800 can include a processor 810, a memory 820, a storage device 830, and an input/output device 840. Each of the components 810, 820, 830 and 840 can be interconnected using a system bus 850. The processor 810 can be configured to process instructions for execution within the system 800. In some implementations, the processor 810 can be a single-threaded processor. In alternate implementations, the processor 810 can be a multi-threaded processor. The processor 810 can be further configured to process instructions stored in the memory 820 or on the storage device 830, including receiving or sending information through the input/output device 840. The memory 820 can store information within the system 800. In some implementations, the memory 820 can be a computer-readable medium. In alternate implementations, the memory 820 can be a volatile memory unit. In yet some implementations, the memory 820 can be a non-volatile memory unit. The storage device 830 can be capable of providing mass storage for the system 800. In some implementations, the storage device 830 can be a computer-readable medium. In alternate implementations, the storage device 830 can be a floppy disk device, a hard disk device, an optical disk device, a tape device, non-volatile solid state memory, or any other type of storage device. The input/output device 840 can be configured to provide input/output operations for the system 800. In some implementations, the input/output device 840 can include a keyboard and/or pointing device. In alternate implementations, the input/output device 840 can include a display unit for displaying graphical user interfaces.

Figure 9:
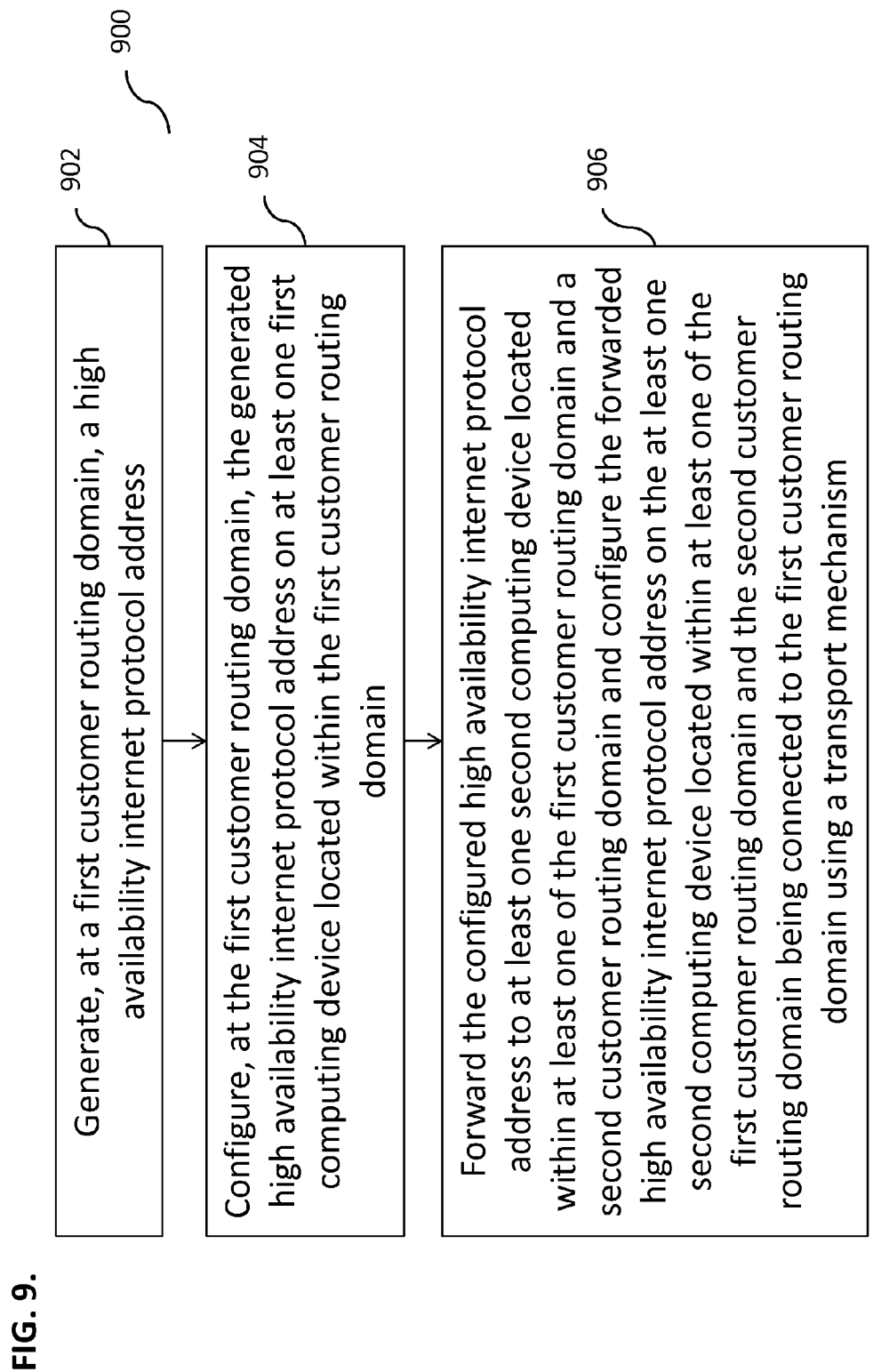
FIG. 9 is an exemplary method, according to some implementations of the current subject matter.

FIG. 9 illustrates an exemplary method 900 for implementing a high availability internet protocol address solution in an enterprise network, according to some implementations of the current subject matter. At 902, a high availability internet protocol address (e.g., 30.0.0.100, as discussed above with regard to FIG. 5) can be generated at a first customer routing domain (e.g., site 502 shown in FIG. 5). At 904, the generated high availability internet protocol address can be configured on a first computing device (e.g., application server E 508 shown in FIG. 5) located within the first customer routing domain (e.g., site 502). At 906, the configured high availability internet protocol address can be forwarded to a second computing device (e.g., application server H 520 shown in FIG. 5) located within a second customer routing domain (e.g., site 504 shown in FIG. 5).

The second computing device can be located within the first customer routing domain. The address can be also configured on the second computing device. The second customer routing domain can be connected to the first customer routing domain using a transport mechanism (e.g., a tunneling protocol (as shown in FIG. 4)). In some implementations, at least one of the first computing device and the second computing device can be configured as a host for providing a communication capability to at least one of the first customer routing domain and the second routing domain based on the high availability internet protocol address.

In some implementations, the current subject matter can include one or more of the following optional features. The first customer routing domain can include a first customer gateway server (e.g., server 516 shown in FIG. 5) for performing the forwarding. The second customer routing domain can include a second customer gateway server (e.g., server 526 shown in FIG. 5) for receiving the configured high availability internet protocol address and for forwarding the configured high availability internet protocol address to the second computing device (e.g., server 520). The transport mechanism (e.g., a tunneling protocol) can include a generic routing encapsulation protocol. The first customer gateway server can be connected to the second customer gateway server using at least one tunnel implementing the generic routing encapsulation protocol (as shown in FIG. 4). The tunneling protocol can connect a first production network (e.g., network 512) of the first customer routing domain and a second production network (e.g., network 522) of the second customer routing domain using the respective first and second customer gateway servers.

In some implementations, the first customer routing domain can include a first router for performing the forwarding. The second customer routing domain can include a second router for receiving the configured high availability internet protocol address and forwarding the configured high availability internet protocol address to the at least one second computing device. The transport mechanism can include a generic routing encapsulation protocol. The first router can be connected to the second router using at least one tunnel implementing the generic routing encapsulation protocol.

In some implementations, the first customer routing domain and the second customer routing domain can be located in a cloud enterprise system (e.g., HEC). The first computing device can include a primary internet protocol address for communicating with other computing devices in at least one of the first customer routing domain and the second customer routing domain. The generated high availability internet protocol address can be a secondary internet protocol address used for communicating with the other computing devices when the primary internet protocol address is not available. When the production IP address of application server E 508 becomes unavailable, the next-hop address can no longer be valid. Thus, it would no longer be possible to reach the high availability internet protocol address. To resolve this issue the high availability internet protocol address has to be routed to another server (e.g. Application Server F) and/or the storage/backup network would have to be used (given that the customer gateway server and application servers are all having access to the bespoke network).

In some implementations, conveying of additional information about the configured high availability internet protocol address can be performed using a domain name system text record.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   generating, at a first customer routing domain, a high availability internet protocol address;
   configuring, at the first customer routing domain, the generated high availability internet protocol address on at least one first computing device located within the first customer routing domain;
   forwarding the configured high availability internet protocol address to at least one second computing device located within at least one of the first customer routing domain and a second customer routing domain and configuring the forwarded high availability internet protocol address on the at least one second computing device located within at least one of the first customer routing domain and the second customer routing domain being connected to the first customer routing domain using a transport mechanism, wherein the forwarding of information containing the configured high availability internet protocol addresses is performed using a domain name system text record; and
   wherein the at least one first computing device and/or the at least one second computing device is configured as a host for providing a communication capability to at least one of the first customer routing domain and the second customer routing domain based on the high availability internet protocol address;
   wherein the at least one of the generating, the configuring, and the forwarding is performed on at least one processor of at least one computing system.

2. The method according to claim 1, wherein
   the first customer routing domain includes a first customer gateway server for performing the forwarding; and
   the second customer routing domain includes a second customer gateway server for receiving the configured high availability internet protocol address and forwarding the configured high availability internet protocol address to the at least one second computing device.

3. The method according to claim 2, wherein the transport mechanism includes a generic routing encapsulation protocol, the first customer gateway server is being connected to the second customer gateway server using at least one tunnel implementing the generic routing encapsulation protocol.

4. The method according to claim 1, wherein
   the first customer routing domain includes a first router for performing the forwarding; and
   the second customer routing domain includes a second router for receiving the configured high availability internet protocol address and forwarding the configured high availability internet protocol address to the at least one second computing device.

5. The method according to claim 4, wherein the transport mechanism includes a generic routing encapsulation protocol, the first router is being connected to the second router using at least one tunnel implementing the generic routing encapsulation protocol.

6. The method according to claim 1, wherein the transport mechanism connects a first production network of the first customer routing domain and a second production network of the second customer routing domain.

7. The method according to claim 1, wherein the first customer routing domain and the second customer routing domain are located in a cloud enterprise system.

8. The method according to claim 1, wherein
   the at least one first computing device includes a first primary internet protocol address for communicating with at least another computing device in at least one of the first customer routing domain and the second customer routing domain;
   the at least one second computing device, after receiving the generated high availability internet protocol address, provides communication with the at least another computing device using a second primary protocol address of the at least one second computing device when the at least one first computing device is not available.

9. The method according to claim 1, wherein the high availability internet protocol address comprises a backup internet protocol address configured to route data in response to a first internet protocol address being unavailable.

10. A system comprising:
at least one programmable processor; and
a machine-readable medium storing instructions that, when executed by the at least one programmable processor, cause the at least one programmable processor to perform operations comprising:
generating, at a first customer routing domain, a high availability internet protocol address;
configuring, at the first customer routing domain, the generated high availability internet protocol address on at least one first computing device located within the first customer routing domain;
forwarding the configured high availability internet protocol address to at least one second computing device located within at least one of the first customer routing domain and a second customer routing domain and configuring the forwarded high availability internet protocol address on the at least one second computing device located within at least one of the first customer routing domain and the second customer routing domain being connected to the first customer routing domain using a transport mechanism, wherein the forwarding of information containing the configured high availability internet protocol addresses is performed using a domain name system text record; and
wherein the at least one first computing device and/or the at least one second computing device is configured as a host for providing a communication capability to at least one of the first customer routing domain and the second customer routing domain based on the high availability internet protocol address.

11. The system according to claim 10, wherein
the first customer routing domain includes a first customer gateway server for performing the forwarding; and
the second customer routing domain includes a second customer gateway server for receiving the configured high availability internet protocol address and forwarding the configured high availability internet protocol address to the at least one second computing device;
the transport mechanism includes a generic routing encapsulation protocol, the first customer gateway server is being connected to the second customer gateway server using at least one tunnel implementing the generic routing encapsulation protocol.

12. The system according to claim 10, wherein
the first customer routing domain includes a first router for performing the forwarding; and
the second customer routing domain includes a second router for receiving the configured high availability internet protocol address and forwarding the configured high availability internet protocol address to the at least one second computing device;
the transport mechanism includes a generic routing encapsulation protocol, the first router is being connected to the second router using at least one tunnel implementing the generic routing encapsulation protocol.

13. The system according to claim 10, wherein the transport mechanism connects a first production network of the first customer routing domain and a second production network of the second customer routing domain;
wherein the first customer routing domain and the second customer routing domain are located in a cloud enterprise system.

14. The system according to claim 10, wherein
the at least one first computing device includes a first primary internet protocol address for communicating with at least another computing device in at least one of the first customer routing domain and the second customer routing domain;
the at least one second computing device, after receiving the generated high availability internet protocol address, provides communication with the at least another computing device using a second primary protocol address of the at least one second computing device when the at least one first computing device is not available.

15. The system according to claim 10, wherein the high availability internet protocol address comprises a backup internet protocol address configured to route data in response to a first internet protocol address being unavailable.

16. A computer program product comprising a machine-readable medium storing instructions that, when executed by at least one programmable processor, cause the at least one programmable processor to perform operations comprising:
generating, at a first customer routing domain, a high availability internet protocol address;
configuring, at the first customer routing domain, the generated high availability internet protocol address on at least one first computing device located within the first customer routing domain;
forwarding the configured high availability internet protocol address to at least one second computing device located within at least one of the first customer routing domain and a second customer routing domain and configuring the forwarded high availability internet protocol address on the at least one second computing device located within at least one of the first customer routing domain and the second customer routing domain being connected to the first customer routing domain using a transport mechanism, wherein the forwarding of information containing the configured high availability internet protocol addresses is performed using a domain name system text record; and
wherein the at least one first computing device and/or the at least one second computing device is configured as a host for providing a communication capability to at least one of the first customer routing domain and the second customer routing domain based on the high availability internet protocol address.

17. The computer program product according to claim 16, wherein
the first customer routing domain includes a first customer gateway server for performing the forwarding; and
the second customer routing domain includes a second customer gateway server for receiving the configured high availability internet protocol address and forwarding the configured high availability internet protocol address to the at least one second computing device;
the transport mechanism includes a generic routing encapsulation protocol, the first customer gateway server is being connected to the second customer gateway server using at least one tunnel implementing the generic routing encapsulation protocol.

18. The computer program product according to claim 16, wherein
    the first customer routing domain includes a first router for performing the forwarding; and
    the second customer routing domain includes a second router for receiving the configured high availability internet protocol address and forwarding the configured high availability internet protocol address to the at least one second computing device;
    the transport mechanism includes a generic routing encapsulation protocol, the first router is being connected to the second router using at least one tunnel implementing the generic routing encapsulation protocol.

19. The computer program product according to claim 16, wherein the transport mechanism connects a first production network of the first customer routing domain and a second production network of the second customer routing domain;
    wherein the first customer routing domain and the second customer routing domain are located in a cloud enterprise system.

20. The computer program product according to claim 16, wherein the high availability internet protocol address comprises a backup internet protocol address configured to route data in response to a first internet protocol address being unavailable.

* * * * *